United States Patent [19]
Bevacqua

[11] 3,741,061
[45] June 26, 1973

[54] PORTABLE HOLDER AND SAW BLADE GUIDE SLOT FOR RIDGEDLY CLAMPING AND CUTTING FLEXIBLE ARMORED ELECTRICAL CABLE AT RIGHT ANGLES TO THE CABLE AXIS

[76] Inventor: Peter V. Bevacqua, 15881 Via Del Sol, San Lorenzo, Calif. 94580

[22] Filed: Dec. 31, 1970

[21] Appl. No.: 103,059

[52] U.S. Cl.......................... 83/454, 83/465, 83/490
[51] Int. Cl........................... B27b 5/20, B23d 45/04
[58] Field of Search..................... 83/490, 453, 454, 83/464, 465, 701; 269/287

[56] References Cited
UNITED STATES PATENTS

| 263,035 | 8/1882 | Fellinger | 269/287 X |
|---|---|---|---|
| 2,003,619 | 5/1935 | Williamson | 269/287 X |
| 2,800,867 | 7/1957 | Smith | 269/287 X |
| 3,057,240 | 10/1962 | De Witt | 83/465 X |

Primary Examiner—J. M. Meister
Attorney—William R. Piper

[57] ABSTRACT

A portable cylindrical holder open at both ends and adapted to receive a portion of a flexible armored electrical cable that is to be cut, the cylindrical holder having a transversely extending hack saw blade receiving slot that extends at right angles to the longitudinal axis of the holder. An adjustable clamping member is disposed within the cylindrical holder and has one end disposed adjacent to the slot. Any desired length of electrical cable is fed through the cylindrical holder and then the portion of cable that is to be cut transversely is rigidly held against twisting by tightening the clamp onto the cable. The operator can now use the slot as a guide for a hack saw blade that will cut the cable at right angles to the cable axis. The device can be manually held while being used or it may be secured to a scaffolding or any other support. A motor driven disc saw for cutting the cable can be mounted on a base plate that is welded to the cylindrical holder.

4 Claims, 5 Drawing Figures

Patented June 26, 1973 3,741,061
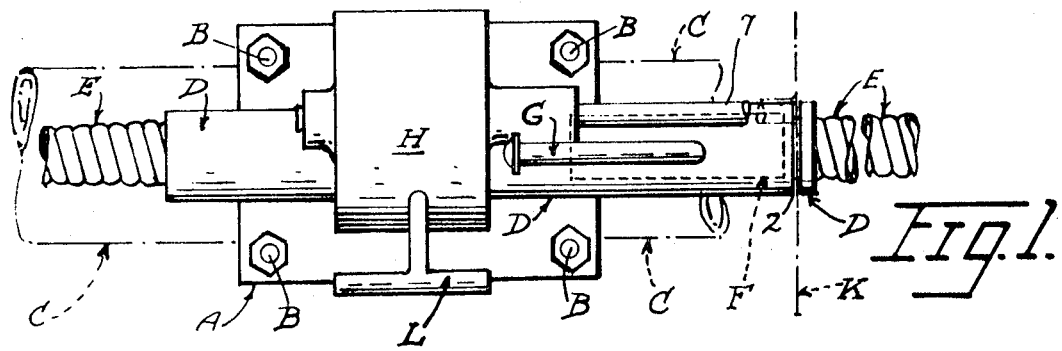
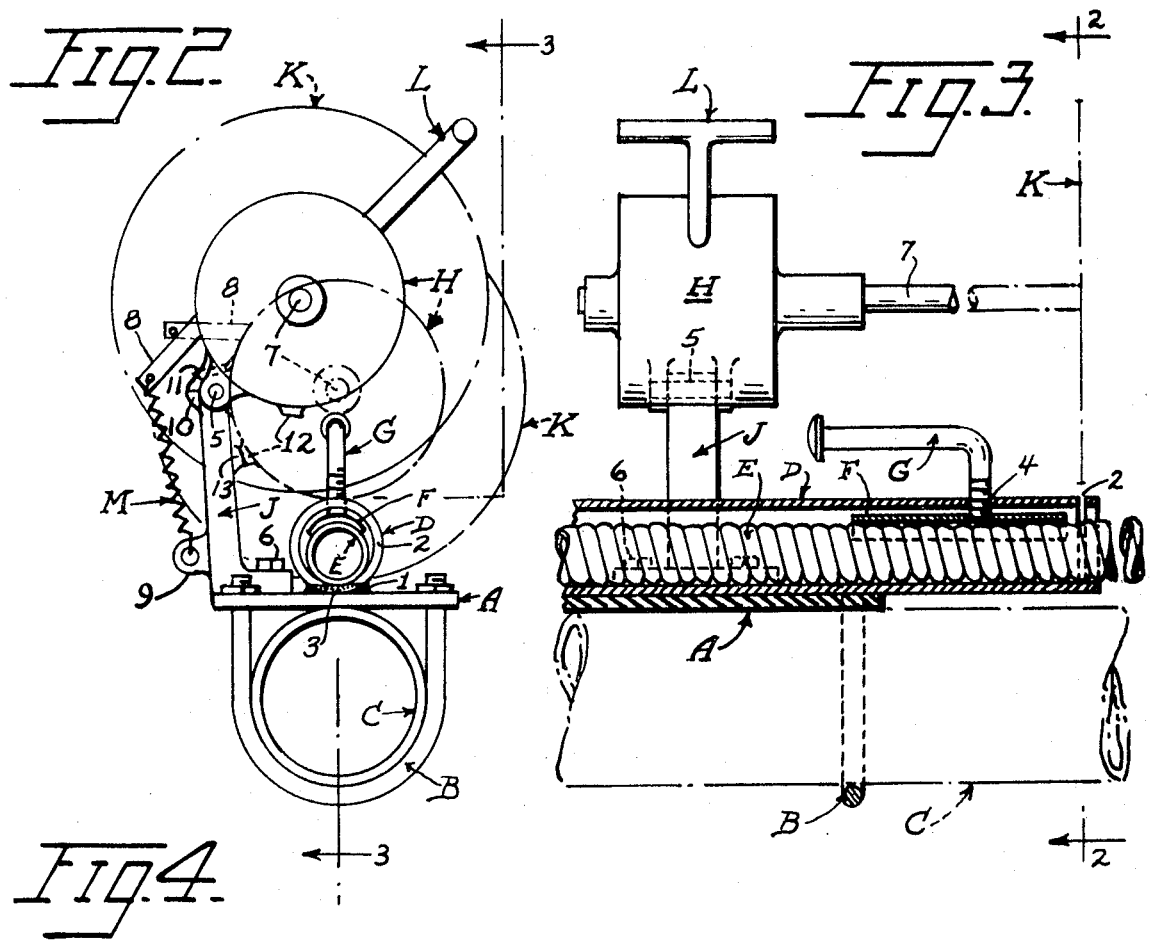
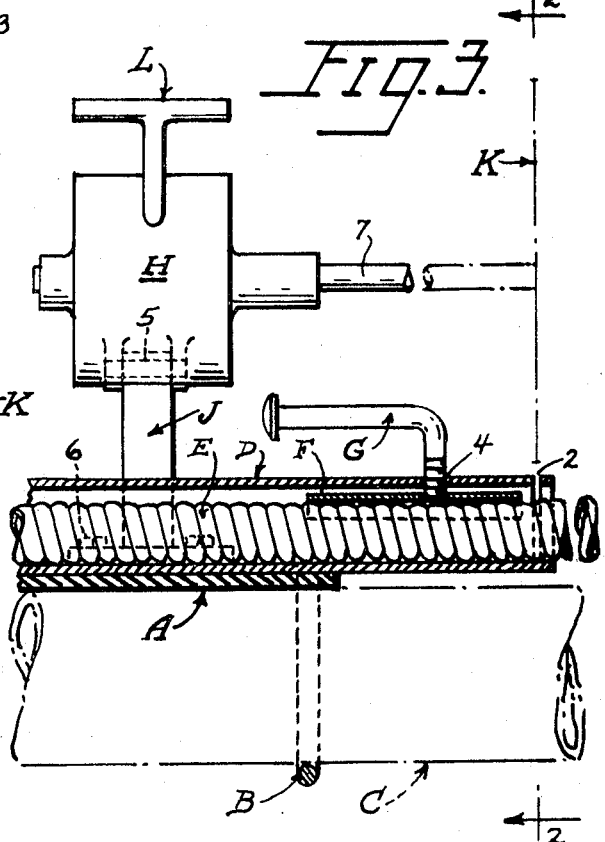
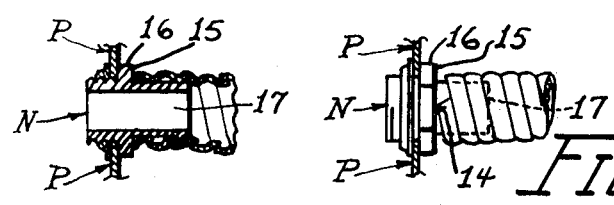
INVENTOR.
Peter V. Bevacqua
BY William R. Piper
ATTORNEY

PORTABLE HOLDER AND SAW BLADE GUIDE SLOT FOR RIDGEDLY CLAMPING AND CUTTING FLEXIBLE ARMORED ELECTRICAL CABLE AT RIGHT ANGLES TO THE CABLE AXIS

BACKGROUND OF THE INVENTION

1. Field of the Invention

It has been the practice of electricians to measure off a desired length of a flexible armored electrical cable and then use a hack saw blade for cutting the cable with a diagonal cut. This results in one of the cut ends having a larger internal diameter than the other cut end. When this larger diameter cut end is mounted on the tubular portion of a flex connector that projects from an electrical outlet box, it is loosely received on the tubular portion due to the fact that the larger diameter end of the flexible conduit is greater than the outer diameter of the tubular portion. Moreover, the diagonal cut made on the conduit end will cause only the pointed outer end of the cut to engage with the adjacent face of the hexagonal nut that forms a part of the flex connector. This is not sufficient to maintain a permanent connection between the flexible conduit and the flex connector the inherent tendency of the flexible conduit to unwind slightly in a counterclockwise rotational movement about its longitudinal axis will cause the end of the conduit to free itself from the flex connector.

The flexible armored electrical cable is transported in rolls of approximately two hundred feet in length. When the electrician unwinds a portion of the roll and cuts off a length of the flexible conduit that he needs with a diagonal cut, the tendency of the cut portion of the conduit is to slowly straighten out from its rolled up form and in doing so there will be a slight counterclockwise rotational movement between the opposite ends of the conduit and along the axis of the conduit which is sufficient to free the larger diameter end from its connection with the flex connector. This will expose the electrical wires between the end of the flexible conduit and the flex connector and will result in a possible fire hazard.

2. Description of the Prior Art

The U.S. Pat. to Monte Frank, on a cable holder and gauge, No. 2,460,001, discloses side flanges of a cable clamp for holding a cable that contains wires enclosed in a helical wound metal casing. A hack saw blade is inserted in slots for cutting the cable and wires. The patentee then states, "Having thus cut the cable and desiring to cut through the armor as is required when making a junction, the cut end of the cable is introduced into a cable support until its cut end is visible through one or the other of the sight openings, depending upon the length of armor that is to be removed. The thumb screw is then turned in the threaded opening firmly to clamp the cable in place and upon introducing a cutting tool such as a hack saw into the diagonal slot, the cutting of the armor may proceed." The cut armor is removed and this exposes the wires.

It should be noted that the tube in the patent drawings has one end permanently closed by a cap that has a spike axially aligned with the tube axis for permitting the operator to thrust "the spike into a fixed support such as a column, stud, or joist in a building which is being wired, and firmly grasping the pistol grip" for steadying the device during the diagonal cutting of the cable. The purpose of the patentee's invention is "to facilitate the cutting of the armor" of the armored electrical cable "at predetermined distances from the end of the cable." In other words, the metal spiral wound armor that enclosed the wires, is cut on a diagonal after the cable is inserted into the tube and the end of the cable is lined up with either one of two "sight openings" provided in the tube. Therefore only a pointed end of the diagonal cut will contact with the nut on the flex connector secured to the outlet box and a loose connection of the cable to the box will result. This is the very feature that the present invention is overcoming.

It will further be noted that the thumb screw for securing the cable in the tube shown in the Frank U.S. Pat. No. 2,460,001, is spaced a considerable distance from the diagonal slot in the tube which is used for guiding the hack saw blade in cutting only the metal armor that contains the electric wires. The set screw cannot rigidly hold the cable from flexing at the place where the diagonal cut is made with the hack saw and this will result in an uneven and difficult cut being made. The present invention places an end of an elongated semi-cylindrical clamp adjacent to a transverse slot in the cylindrical holder so that the cable can be rigidly held from flexing at the very point where the cable is to be cut. This permits the cylindrical holder to have a greater inside diameter than the outer diameter of the cable and the device may be used for cutting cables of different diameters at right angles to the axis of the cable. The present invention is only for cutting flexible cables that do not have wires in them.

SUMMARY OF THE INVENTION

An object of my invention is to provide a portable device for rigidly holding a flexible armored electrical cable at a point where a transverse cut at right angles to the cable axis is to be made by means of a hack saw or a motor driven disc saw. A slot in the cylindrical holder guides the hack saw blade in making the correct right angle cut. A motor driven disc saw may be mounted on the device and novel means is provided for yielding holding the saw in inoperative position. This same means also limits the movement of the saw as the operator manually moves the saw through the cable during the cutting action. The saw is stopped from further movement in the same direction as soon as the cable is severed and this prevents the saw teeth from contacting the cylindrical holder in which the cable is clamped.

A further object of my invention is to provide a cylindrical holder that is open at both ends and this permits the electrician to feed any desired length of cable through the holder until the point is reached where the cable is to be cut. This point on the cable is aligned with the guide slot in the holder through which the saw will pass. Before the cutting operation, however, the operator firmly clamps the cable adjacent to the line of cut so as to prevent the cable from flexing during the cutting operation. The inner diameter of the cylindrical holder is large enough to receive cables of different diameters. The cable clamping means when in clamping position will prevent any flexing of the cable regardless of the size of the outer diameter of the cable.

BRIEF DESCRIPTION OF THE DRAWING

FIG. 1 is a top plan view of the device and illustrates a length of armored electrical cable clamped in position in a cylindrical holder and ready to be cut.

FIG. 2 is a transverse section through the device and is taken along the line 2—2 of FIG. 3 in a plane that coincides with the guide slot in the holder through which the saw passes during the cutting operation.

FIG. 3 is a longitudinal section through a portion of the device and is taken along the line 3—3 of FIG. 2. The electric motor and disc saw attachment are shown in side elevation.

FIG. 4 shows a flex connector in longitudinal section and illustrates the proper connection of the cable end to the connector when this end has been cut at right angles to the cable axis.

FIG. 5 illustrates the larger diameter cable end with a diagonal cut and how only the outer point of the cut engages with the shoulder of the flex connector. The inherent tendency of the connected cable to rotate slightly on its own axis will likely free the pointed end of the diagonal cut from its contact with the shoulder on the flex connector and the cable end will pull free of the connector.

DESCRIPTION OF THE PREFERRED EMBODIMENT

In carrying out my invention I provide a base indicated generally at A in FIGS. 1, 2 and 3. The base is preferably rectangular in shape and it is small enough to be readily portable. It is possible to removably secure the base to any desired support and to this end it is provided with four openings, one being disposed adjacent to each corner of the base. If the base is to be temporarily secured to a part of the framing in a building, screws or nails can be inserted in the openings for securing the base to a desired part of the wooden structure. Should scaffolding be used, I have provided U-bolts indicated at B, that have their curved portions engaging a tubular scaffold pipe C and the ends of the U-bolts are received in the openings in the base and nuts are mounted on the ends for clamping the base to the scaffold.

A cylindrical holder D for receiving a flexible cable E extends longitudinally along the top of the base A and it is welded at 1 or otherwise secured to the base, see FIG. 2. The inner diameter of the holder D is large enough to receive flexible cables of different diameters. Both ends of the holder are open and they preferably extend beyond the adjacent ends of the rectangular base. A saw guide slot 2 is provided in the holder adjacent to one end thereof and the plane of the slot extends at right angles to the axis of the holder. The slot 2 does not extend entirely through the holder. FIG. 2 shows the slot terminating adjacent to the welding 1 that secures the holder to the base. The slot 2 leaves an uncut portion 3 of the holder that is flush or tangent with the inner cylindrical surface of the holder and this portion is case hardened so that if a band saw, not shown, is used for cutting the cable or conduit E, the saw teeth will have no effect on penetrating the case hardened portion after the saw has been used for completely severing the cable.

I provide a cable clamping member F, see FIGS. 1, 2 and 3 and mount it within the cylindrical holder D. The member F is arcuate in cross section and it is secured to the inner end of an L-shaped bolt indicated at G. The bolt has its threaded portion received in a threaded opening 4 provided in the cylindrical holder D, see FIG. 3, and the bolt constitutes manual means for moving the member F against the cable E. The right hand end of the clamping member F is disposed adjacent to the guide slot 2 in the cable holder and the length of the clamping member is sufficient to clamp an equivalent length of the flexible cable for preventing this portion from flexing or moving during the cutting of the cable along a plane that coincides with the plane of the slot 2 and extends at right angles to the portion of the cable that is rigidly held from movement by the clamping member F. In this manner the operator is assured that the cut end of the cable extends at right angles to the cable axis. The device can be used with a hack saw, not shown, whose blade can be inserted into the guide slot 2 and the slot will guide the cable cutting blade so that the cut end of the cable will be at right angles to the cable axis.

Before describing the operation of the device it is first best to set forth that a motor driven disc saw is mountable on the base A and it can be used in place of the hack saw. A small electric motor H has its casing pivotally mounted at 5 to an upright J, see FIGS. 2 and 3, and the upright in turn is attached to the base A by bolts or studs 6. The motor has a shaft 7 whose axis parallels the axes for the cylindrical holder D and the cable E. A disc saw, indicated diagrammatically by the dot dash line K, in FIGS. 1 and 3, is mounted on the shaft 7 in a position where the plane of the disc saw will coincide with the plane of the slot 2 in the holder D. It is possible to swing the motor H through an arc about the pivot pin 5 from the inoperative position, shown by the full lines in FIG. 2, into operative position, shown by dot-dash lines in the same Figure. The motor casing is provided with a handle L for this purpose.

I provide novel means for limiting the swing of the motor H and the disc saw K between inoperative and operative positions. This means is illustrated in FIGS. 2 and 3, but not in the top plan view of FIG. 1. I also provide a spring M, see FIG. 2, for yieldingly holding the motor and disc saw in inoperative position. The motor casing has an integral arm 8 that projects therefrom and the other end of the arm has one end of the coil spring M connected thereto. The motor supporting upright J has a lug 9 to which the other end of the spring M is connected.

The means for limiting the upward or counterclockwise swing of the motor H and disc saw K into inoperative position is illustrated in FIG. 2. The motor supporting upright J has a stop lug 10 disposed near to the pivot pin 5. The motor casing carries an integral stop lug 11 that lies in the same plane as the stationary stop lug 10. When the spring M moves the motor H into inoperative position where the disc saw K clears the slot 2 in the cable holder D, the stop lug 11 on the motor casing will strike the stop lug 10 and prevent further swinging movement in a counterclockwise direction when looking at FIG. 2.

The means for limiting any further downward or clockwise movement of the motor H when the disc saw K has cut through the cable E, see the dot-dash circle K in FIG. 2, which represents the completion of the cutting stroke by the disc saw, comprises a projection 12 on the underside of the motor casing that contacts a stationary projection 13 provided on the upright J when the teeth on the disc saw have severed the cable E and are prevented from cutting the case-hardened portion 3 of the holder D. In this way the disc saw teeth are permitted only to cut through the cable E and nothing else.

OPERATION

From the foregoing description of the various parts of the device, the operation thereof may be readily understood. I have already explained how the device can clamp a flexible conduit rigidly in place preparatory to the cutting operation. If a hack saw is to be used for the cutting of the cable E, the motor H is not mounted on the base A. The electrician will determine the length of the conduit which is to be cut from a roll of conduit and will feed the conduit through the holder J until this desired length of conduit or cable extends to the right of the guide slot 2 in FIG. 3, whereupon the cable is clamped in place by rotating the bolt G until the clamping member F rigidly secures the cable in place in the holder. If the motor H and disc saw K are used, the motor supporting upright J is secured to the base A by the cap screws or bolts 6 and the cable cutting is done in the manner already described.

The standard flexible armored electrical cable E is formed by a spirally wound strip of metal that is curved in cross section so as to provide a groove on one side of the strip and a convex ridge on the other side. The helical winding of the strip will form a cable of the desired diameter and in which the adjacent coils permit a certain amount of flexing of the cable. When an electrician cuts the cable with a diagonal cut, he will have one end of the cable with a larger diameter than the adjacent end of the other cable length. FIG. 5 illustrates how the larger inner diameter end of the diagonally cut cable E will have only the pointed outer portion 14 of the diagonal cut contact with the adjacent face 15 of a hexagonal nut 16 that is integral with a flex connector indicated generally at N. Since the larger inner diameter end of the flexible cable E is mounted on the cylindrical portion 17 of the flex connector N, it will be loosely mounted on this cylindrical portion because the inner diameter of the cable is larger than the outer diameter of the cylindrical portion. Therefore, the only real point of contact between the cable E and the flex connector N is made by the pointed end 14 of the diagonal cut contacting with the face 15 of the nut 16. The inherent tendency of the flexible cable to rotate slightly about its axis is frequency sufficient to dislodge the pointed end 14 from its contact with the face 15 and the cylindrical portion 17 has helical rib portions that will be engaged by the helical coil of the cable and cause the cable to back away from the nut 16 and move the pointed end 14 of the cable out of contact with the face 15. The cable end is now freed sufficiently from the flex connector N that it can slip entirely off from the cylindrical portion 17 and expose the portions of the wires, not shown, that extend from the cable into an outlet box, one wall P of which is shown in FIG. 5. This produces a fire hazard.

In FIG. 4, I illustrate how the cable E end when cut at right angles to the axis of the cable, as performed by my invention, will have its entire circumferential edge in contact with the face 15 of the hexagonal nut 16 that is integral with the flex connector N. I have found that when the entire circumferential edge of the end of the cable frictionally engages with the face 15, the inherent tendency of the cable end to rotate slightly about its axis does not produce a sufficient force to overcome the frictional connection between the cable end and the nut face 15. This will prevent the cable end from becoming accidentally loosened from the flex connector N and there will be no exposure of the wires that extend from the cable into the electrical outlet box P.

I claim:

1. A device of the type described comprising:
   a. a cylindrical holder open at both ends and having a transversely extending saw blade guide slot with the plane of the slot extending at right angles to the longitudinal axis of the cylindrical holder, the slot extending through the holder so that the ends of the slot lie tangent to the inner cylindrical wall of the holder;
   b. a clamping member arranged within said holder for clamping a flexible cable received in the holder, said clamping member having one end disposed adjacent to said slot so as to grip the cable firmly at the place where it is to be cut;
   c. manually controlled means for moving said clamping member into engagement with the cable, said clamping member having a link sufficient for holding rigid the portion of cable that lies adjacent to the place where the cable is to be cut so as to insure that the plane of the cut on the cable will be at right angles to the axis of the gripped portion of the flexible cable;
   d. a base welded to the exterior surface of said cylindrical holder along a line that extends between the ends of the transversely extending saw blade guide slot;
   e. means for removably securing said base to a support;
   f. a motor pivotally mounted on said base so that the shaft of said motor will parallel the axis of said cylindrical holder and the axis of the flexible cable clamped within the holder; and
   g. a disc saw mounted on said motor shaft and having the plane of the disc coinciding with the plane of the saw blade receiving slot in the holder;
   h. whereby said motor can be swung about its pivot for moving the disc saw into said slot for cutting the cable in a plane at right angles to the axis of the cable.

2. A device of the type described comprising:
   a. a cylindrical holder open at both ends and having a transversely extending saw blade guide slot with the plane of the slot extending at right angles to the longitudinal axis of the cylindrical holder, the slot extending through the holder so that the ends of the slot lie tangent to the inner cylindrical wall of the holder;
   b. a clamping member arranged within said holder for clamping a flexible cable received in the holder, said clamping member having one end disposed adjacent to said slot so as to grip the cable firmly at the place where it is to be cut; and
   c. manually controlled means for moving said clamping member into engagement with the cable, said clamping member having a length sufficient for holding rigid the portion of cable that lies adjacent to the place where the cable is to be cut so as to insure that the plane of the cut on the cable will be at right angles to the axis of the gripped portion of the flexible cable;

d. the uncut portion of the cylindrical holder that lies adjacent to said saw blade guide slot being case hardened to prevent the saw blade from cutting into the holder after the blade has severed the cable.

3. The combination as set forth in claim 1; and in which
   a. means is provided for stopping the motor from being swung any farther above its pivot in the same direction when said disc saw completes its cut through the cable received in said holder;
   b. spring means for swinging the motor and saw so as to free the latter from the slot in the holder; and
   c. means for stopping any farther swinging of the motor in the same direction when the saw is freed from said slot.

4. A device of the type described comprising:
   a. a cylindrical holder open at both ends and having a transversely extending saw blade guide slot with the plane of the slot extending at right angles to the longitudinal axis of the cylindrical holder, the slot extending through the holder so that the ends of the slot lie tangent to the inner cylindrical wall of the holder;
   b. a clamping member arranged within said holder for clamping a flexible cable received in the holder, said clamping member having one end disposed adjacent to said slot so as to grip the cable firmly at the place where it is to be cut;
   c. manually controlled means for moving said clamping member into engagement with the cable, said clamping member having a length sufficient for holding rigid the portion of cable that lies adjacent to the place where the cable is to be cut so as to insure that the plane of the cut on the cable will be at right angles to the axis of the gripped portion of the flexible cable;
   d. a base welded to the exterior surface of said cylindrical holder along a line that extends between the ends of the transversely extending saw blade guide slot; and
   e. means for removably securing said base to a support.

* * * * *